Figure 1:
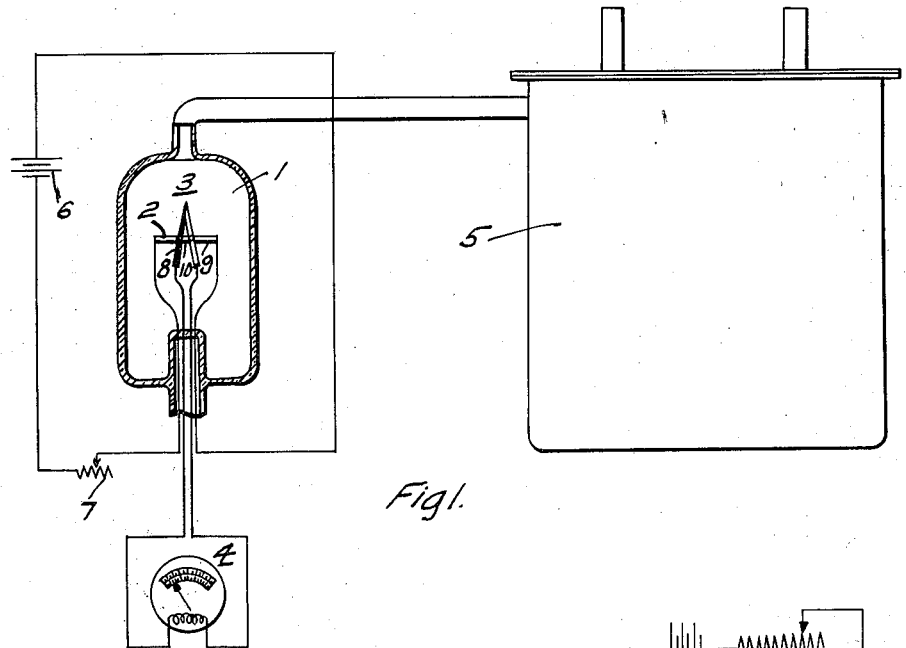

Nov. 24, 1925.  1,563,053

J. L. WEATHERWAX

THERMOCOUPLE BULB FOR ELECTRICAL MEASURING APPARATUS

Filed May 24, 1921

Inst. Readings.

Pressure.

WITNESSES:  INVENTOR
K. C. Clowes  James L. Weatherwax.
J. E. Foster  BY
  Wesley G. Carr
  ATTORNEY Patented Nov. 24, 1925.

1,563,053

UNITED STATES PATENT OFFICE.

JAMES L. WEATHERWAX, OF EAST ORANGE, NEW JERSEY, ASSIGNOR TO WESTINGHOUSE LAMP COMPANY, A CORPORATION OF NEW JERSEY.

THERMOCOUPLE BULB FOR ELECTRICAL MEASURING APPARATUS.

Application filed May 24, 1921. Serial No. 472,164.

*To all whom it may concern:*

Be it known that I, JAMES L. WEATHERWAX, a citizen of the United States, and a resident of East Orange, in the county of Essex and State of New Jersey, have invented a new and useful Improvement in Thermocouple Bulbs for Electrical Measuring Apparatus, of which the following is a specification.

My invention relates to measuring devices and particularly to means for accurately indicating variations of temperature and pressure.

One object of my invention is to provide a device that may be used either for accurately indicating the variations in temperature to which a device is subjected or the degree of vacuum or internal pressure obtaining in the device or in any other device to which it may be connected.

Another object of my invention is to provide a device, of the above-indicated character, that may be periodically adjusted to permit an indicating instrument embodying a definite range of measurement to be employed for indicating measurements over a larger range.

Another object of my invention is to provide a device of the above-indicated character that is simple and economical in construction and effective in its operation.

United States Patent No. 1,274,635, issued Aug. 6, 1918, to William Tschudy, and assigned to the Westinghouse Electric & Manufacturing Company, discloses a pressure-measuring apparatus comprising a sealed bulb that encloses a heating element and a thermocouple, the junction of which is secured to the heating element. A measuring instrument connected to the thermocouple indicates the degree of vacuum within the bulb.

In practicing my invention, I provide a similar bulb containing a heating element and a thermocouple. However, instead of securing the thermocouple to the heater at the junction of the couple, I secure each element of the couple to the heater at a point near the junction intermediate the junction and the external connection of the bulb. A sensitive milli-voltmeter or galvanometer that is connected to the thermocouple will then indicate variations in the pressure within the bulb, assuming the current traversing the heater to be maintained at a constant value, or the meter will indicate the temperature within the tube if the pressure is maintained constant.

When the pressure within the bulb decreases to a predetermined value, the indicating pointer of the instrument is deflected to almost the full-scale deflection. In order to measure further variations in the pressure within the bulb, the value of the current traversing the heating element is adjusted to counter-balance the thermo-electromotive force developed in the thermocouple between the two points of its connection to the heating element.

The electromotive force, to which the instrument is subjected, is thereupon diminished to zero value and the instrument is then effective for indicating further variations of the pressure within the bulb.

Figure 2:
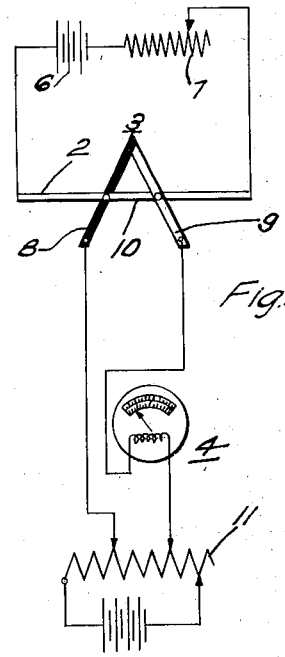

Figures 1 and 2 of the accompanying drawings are diagrammatic views of a plurality of systems comprising a measuring device embodying my invention and illustrating the application of the same for determining internal pressure, or the degree of vacuum of an evacuated vessel, or the temperature obtaining therein.

Figure 3:
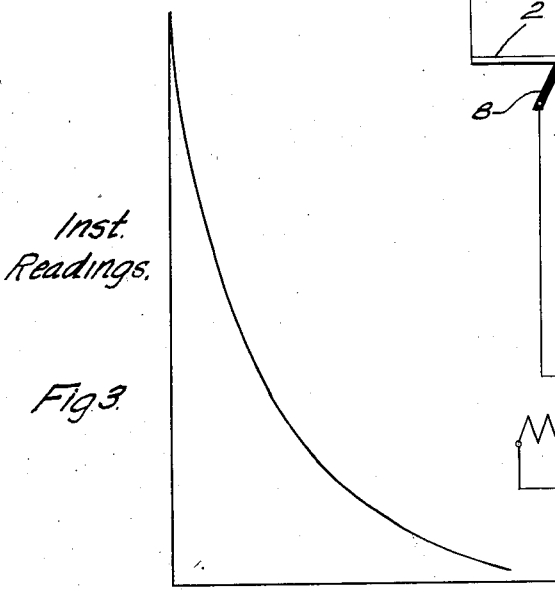

Fig. 3 is a curve illustrating the relation between the pressure within the bulb and the instrument readings.

Referring to Fig. 1, the measuring instrument comprises a bulb 1 containing a heating element 2 and a thermocouple 3 secured thereto. An indicating instrument 4 is connected to the terminals of the thermocouple 3 to indicate the degree of vacuum or internal pressure of an evacuated device 5.

The circuit of the heating element 2 includes a source 6 of electromotive force and an adjustable resistor 7 for controlling the amount of current that shall traverse the heating element 2.

The thermocouple 3 preferably comprises an element 8 of manganin and an element 9 of advance. These elements have negligible temperature coefficients of resistance and are, therefore, unaffected by variations of internal temperature of the bulb 1 for affecting the accuracy of the measurements.

The source 6 of electromotive force is so connected to the heater element as to produce a drop of potential in the portion 10 of the heater element, between the points at which the thermocouple elements are secured thereto, that opposes the electromotive force of the couple. By means of the resistor 7, the thermal electromotive force and the drop of potential in the portion 10 of the heater element may be counterbalanced at any value of pressure within the bulb.

Since the elements of the thermocouple are connected in series with the portion 10 and the indicating instrument 4, the instrument will not be energized, and will, therefore, indicate zero deflection when the drop in potential in the portion 10 is equal and opposite to the electromotive force developed in the couple.

The electromotive force of the thermocouple may be similarly opposed and counterbalanced by an external electromotive force at any value of pressure within the bulb. In Fig. 2 is illustrated such a system in which the potential difference between two points of a resistor 11 is employed to counterbalance the couple electromotive force.

When the pressure decreases within the bulb, according to the curve shown in Fig. 3, the instrument is deflected to substantially full-scale deflection. By readjusting the current that traverses the heater 2 or the resistor 11, to again counter-balance the electromotive force of the couple, the instrument may be caused to indicate zero deflection, and additional measurement may then be obtained by the same instrument for further variations of pressure within the bulb 1.

By thus adjusting the value and the direction of current that traverses the heater to produce a drop of potential opposite and equal to the thermo-electromotive force developed in the thermocouple at a predetermined pressure and by so connecting the thermocouple that portions of the elements are included in the measuring circuit, the instrument may be caused to measure over a relatively greater range than the normal range of the instrument.

Although the elements of the thermocouple are illustrated in the drawings as connected, at their mid-points, to the heater, the elements are preferably severally connected to the heater, when embodied in a commercial device, at a point that is approximately $\frac{1}{20}$ of the distance from the junction to the external connections.

My invention is not limited to the specific device or to the specific arrangement thereof except as set forth in the appended claims.

I claim as my invention:

1. In a thermal bulb for a measuring instrument, the combination with a current-conducting element serving as a heating element, of a thermocouple having each element thereof secured intermediate its ends to the heating element.

2. In a thermal bulb for a measuring instrument, the combination with a current-conducting element serving as a heating element, of a thermocouple having one element thereof secured intermediate its ends to the heating element.

3. The method of extending the range of a vacuum measuring instrument associated with a thermocouple which comprises subjecting said thermocouple to the vacuum being measured and balancing the electromotive force set up in the couple at such vacuum by the drop in potential between two predetermined points of the heater to depress the instrument reading to zero.

4. In a thermal measuring instrument, the combination with an evacuated bulb containing a heater element, of a thermocouple, each element of which is secured intermediate its ends to the heater element, and means for varying the potential difference between the points of the heater to which the couple elements are secured.

5. In a thermal measuring instrument, the combination with an evacuated bulb containing a heater element, of a thermocouple, each element of which is secured intermediate its ends to the heater element, and means for adjusting the potential difference between the points of the heater to which the thermocouple elements are secured to correspond to the electromotive force of the thermocouple.

6. In a thermal measuring instrument, the combination with an evacuated bulb containing a heater element, of a thermocouple, each element of which is secured intermediate its ends to the heater element, and means for producing a potential difference in the heater element that is equal and opposite to the electromotive force of the thermocouple.

In testimony whereof, I have hereunto subscribed my name this 9th day of May, 1921.

JAMES L. WEATHERWAX.